United States Patent [19]
Faulkner et al.

[11] Patent Number: 5,339,946
[45] Date of Patent: Aug. 23, 1994

[54] CONVEYOR BELT HAVING LINK ASSEMBLIES WITH LEADING AND TRAILING SHAFT PROJECTIONS

[75] Inventors: William G. Faulkner; Marie-Francoise B. Faulkner, both of 6701 Newman Dr., Oklahoma City, Okla. 73162

[73] Assignees: William G. Faulkner; Marie-Francoise Bigot Faulkner, Oklahoma City, Okla.

[21] Appl. No.: 976,613

[22] Filed: Nov. 16, 1992

[51] Int. Cl.$^5$ .................................... B65G 45/00
[52] U.S. Cl. .......................... 198/494; 198/853
[58] Field of Search ............ 198/851, 852, 853, 494, 198/497

[56] References Cited

U.S. PATENT DOCUMENTS

| | | | |
|---|---|---|---|
| 1,565,760 | 12/1925 | Sutherland | 198/853 X |
| 2,165,422 | 7/1939 | Stanius | 198/851 |
| 2,852,129 | 9/1958 | Conner | 198/853 |
| 3,269,526 | 8/1966 | Imse et al. | 198/853 |
| 3,774,752 | 11/1973 | Harvey | 198/852 |
| 4,709,807 | 12/1987 | Poerink | 198/853 |
| 4,742,907 | 5/1988 | Palmaer | 198/852 X |
| 4,972,942 | 11/1990 | Faulkner | 198/853 |
| 4,993,544 | 2/1991 | Bailey et al. | 198/853 X |
| 5,020,656 | 6/1991 | Faulkner | 198/853 X |
| 5,058,732 | 10/1991 | Lapeyre | 198/852 |
| 5,096,053 | 3/1992 | Hodlewsky | 198/853 |
| 5,125,504 | 6/1992 | Corlett et al. | 198/853 X |
| 5,181,601 | 1/1993 | Palmaer et al. | 198/852 X |

*Primary Examiner*—Cheryl L. Gastineau
*Attorney, Agent, or Firm*—Dunlap, Codding & Lee

[57] ABSTRACT

A conveyor having a plurality of link assemblies with a leading end of each link assemblies being connectable to the trailing end of one of the other link assemblies for forming the conveyor belt. A plurality of spaced apart leading shaft projections are formed on the leading end of each link assembly and a plurality of trailing shaft projections are formed on the trailing end of each link assembly. Each of the leading shaft projections has a thickness which is greater than a thickness of each of the trailing shaft projections. Each of the leading shaft projections has a first wall and a second wall. The first and the second walls are each formed on a radius and curved inwardly from an upward end toward a lower end of each leading shaft projection. The trailing shaft projections are disposed in the spaces between the leading shaft projections and the curved walls on the leading shaft projection cooperate to expose a substantial portion of the shafts connecting adjacent link assemblies.

16 Claims, 4 Drawing Sheets

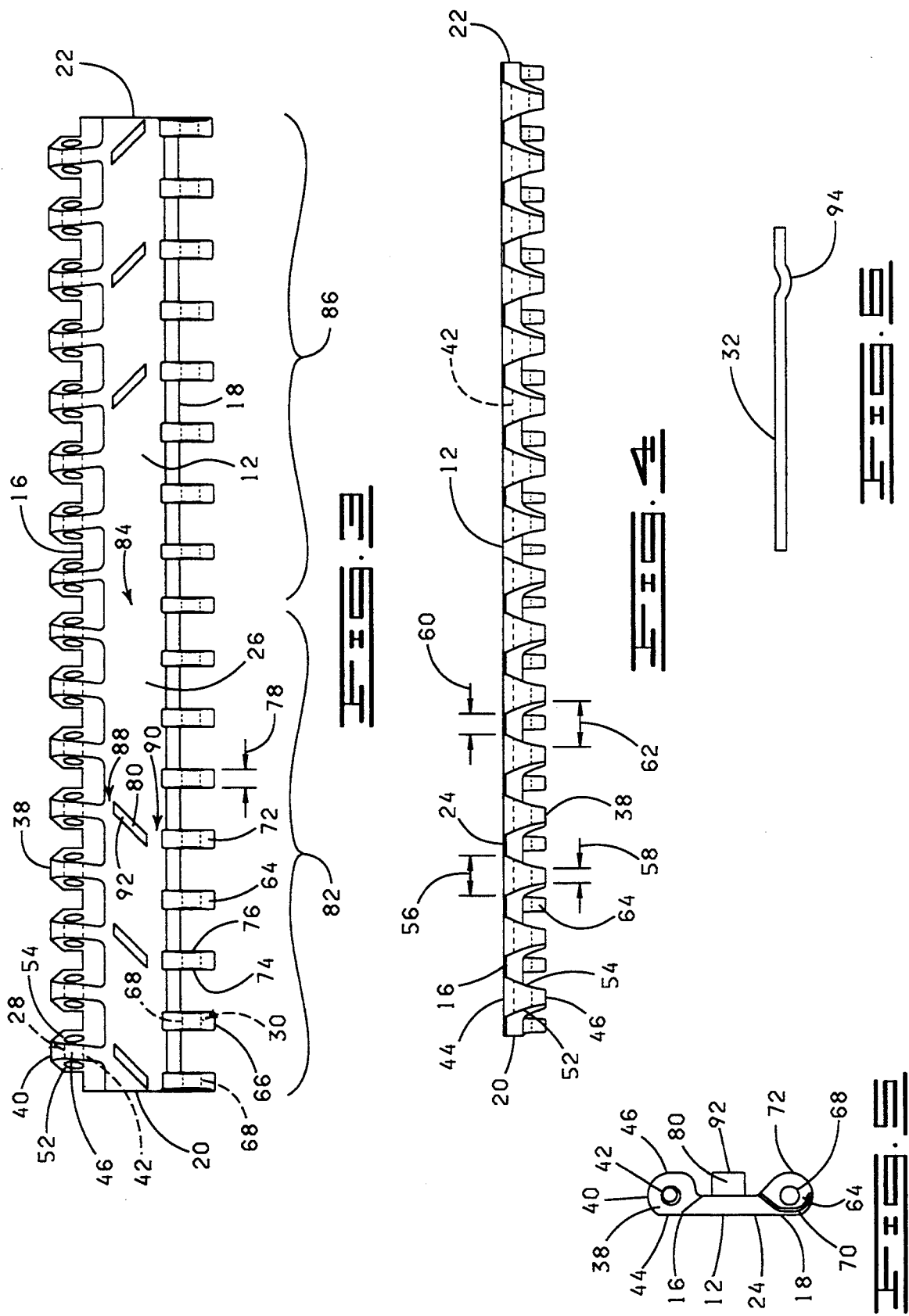

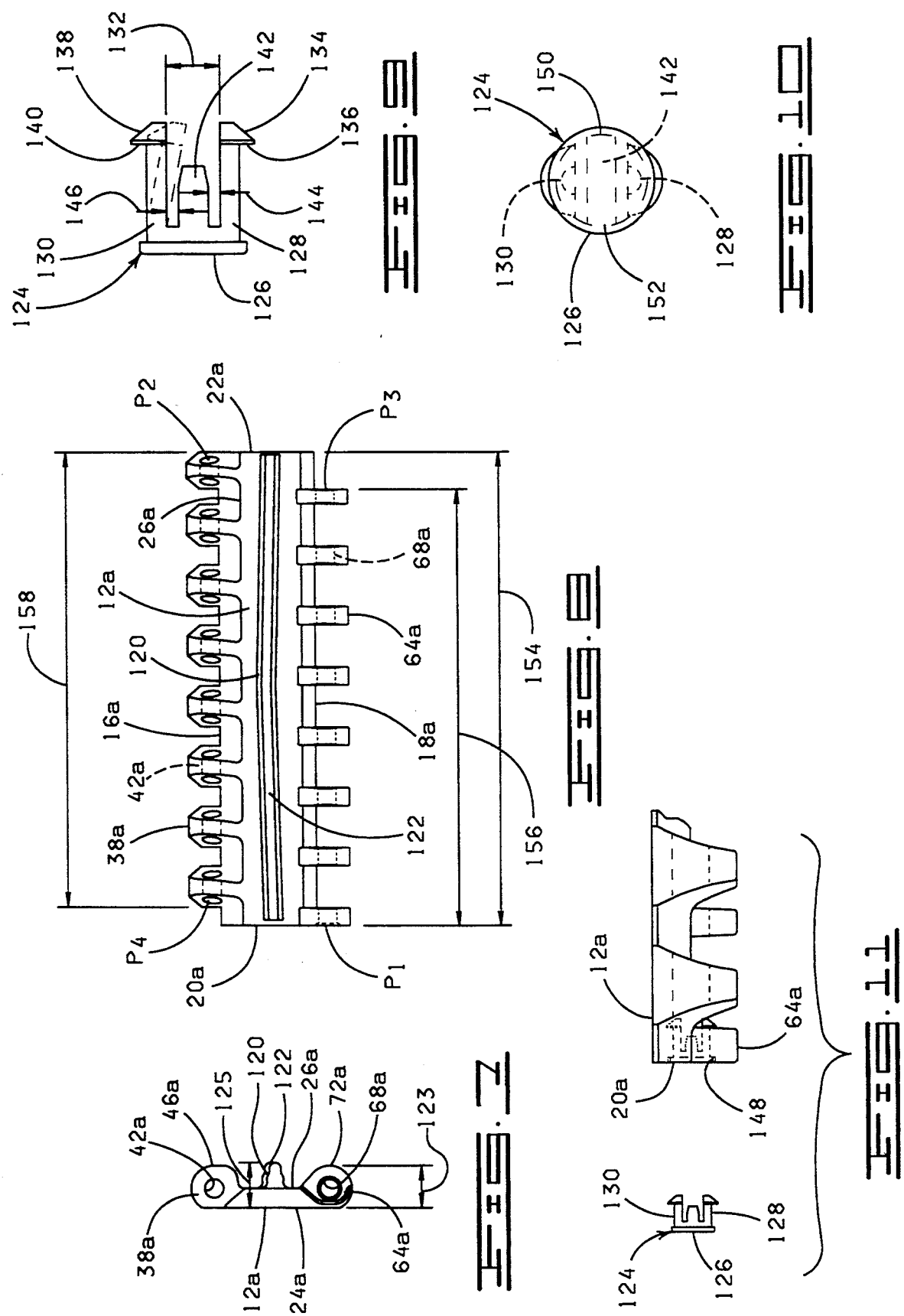

CONVEYOR BELT HAVING LINK ASSEMBLIES WITH LEADING AND TRAILING SHAFT PROJECTIONS

FIELD OF THE INVENTION

The present invention relates generally to conveyor belts and, more particularly, but not by way of limitation, to a conveyor belt having leading shaft projections which are thicker than the trailing shaft projections and leading shaft projections with curved in walls for exposing a substantial portion of the shaft connecting adjacent link assemblies and reducing sharp edges, and a link shaft with a curved portion for securing the link shaft in position.

BRIEF DESCRIPTION OF THE DRAWINGS

FIG. 3 is a bottom plan view of a typical link assembly.

FIG. 4 is an end elevational view of the leading end of the link assembly of FIG. 3.

FIG. 5 is a side elevational view of the link assembly of FIGS. 3 and 4.

FIG. 6 is a side elevational view of a typical link shaft.

FIG. 7 is an end elevation view of a modified link assembly.

FIG. 8 is a bottom plan view of the modified link assembly of FIG. 7.

FIG. 9 is a side elevational view of a cap constructed in accordance with the present invention.

FIG. 10 is a top elevational view of the cap of FIG. 9.

FIG. 11 is a partial front elevational view of a link assembly with the cap of FIGS. 9 and 10 shown in solid-lines in a position prior to assembly to the link assembly and shown in dashed-lines in an assembled position.

DESCRIPTION OF THE PREFERRED EMBODIMENTS

Figure 1:
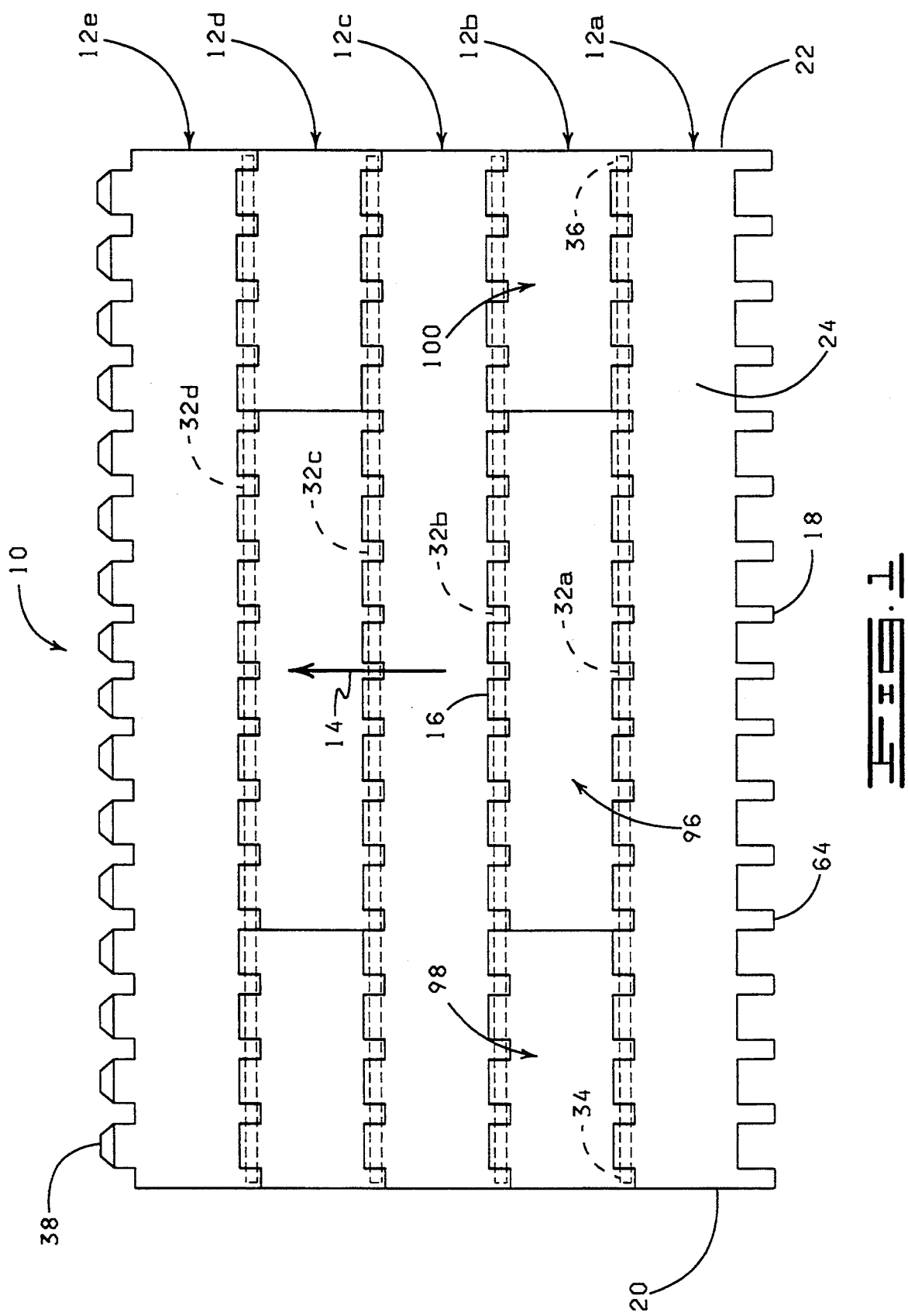
FIG. 1 is a top plan view of a portion of a conveyor belt constructed in accordance with the present invention and with only some of the link assemblies being shown in the drawing.
Figure 2:
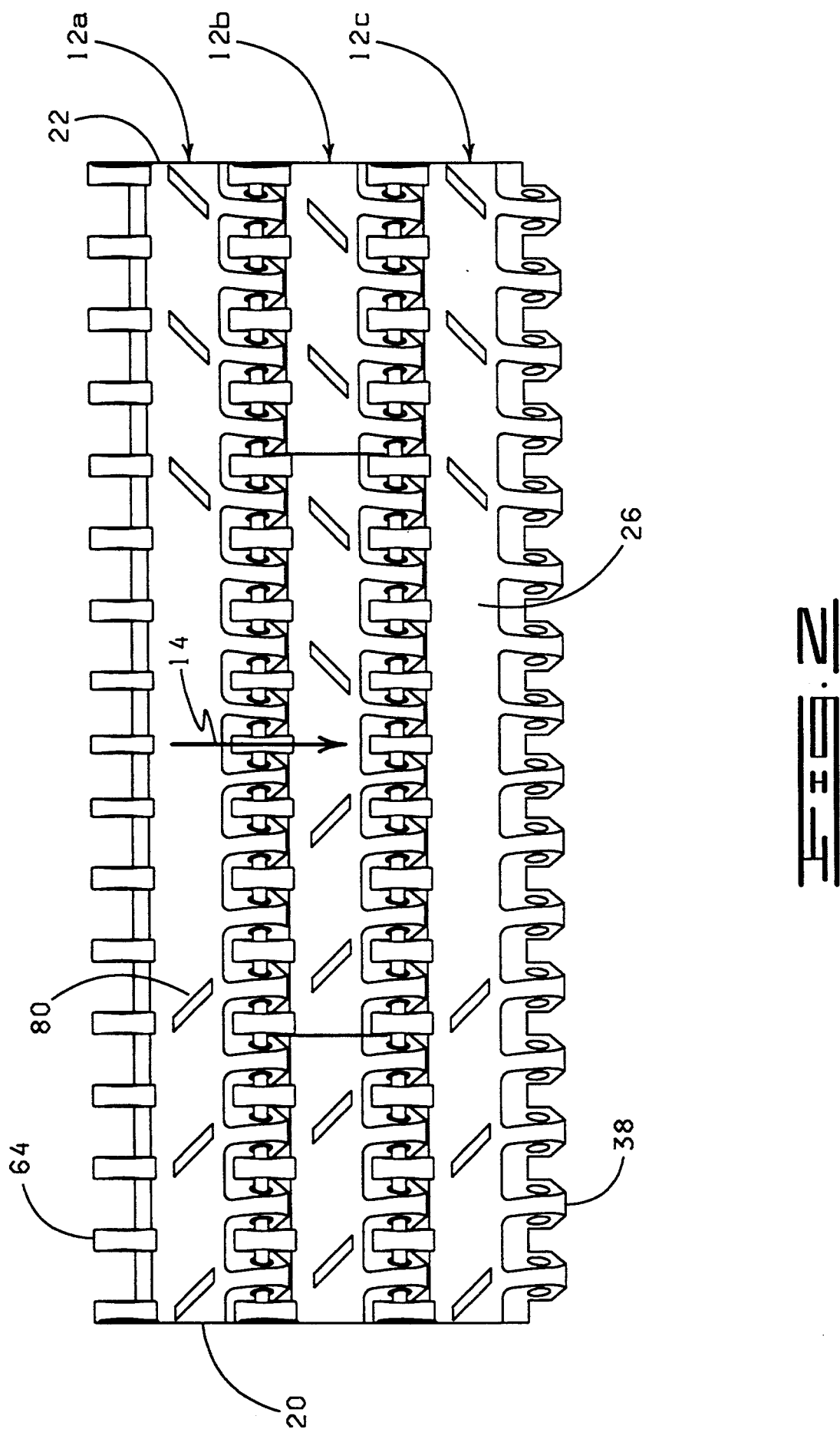
FIG. 2 is a bottom plan view of the conveyor belt of FIG. 1, with only some of the link assemblies being shown in the drawing.

Shown in FIGS. 1 and 2 and designated therein by the general reference numeral 10 is a conveyor belt which is constructed in accordance with the present invention. The conveyor belt 10 comprises a plurality of link assemblies 12. Only a portion of the conveyor belt 10 is shown in FIG. 1 and, more particularly, only five link assemblies 12 of the conveyor belt 10 are shown in FIG. 1 wherein the five link assemblies are designated by the reference numerals 12a, 12b, 12c, 12d and 12e, respectively. It is to be understood that a conveyor belt constructed in accordance with the present invention in practice will comprise a large number of link assemblies 12 interconnected to form an endless conveyor belt which generally is extended about sprockets (not shown) and used for conveying objects in a manner well known in the art.

The conveyor belt 10 is constructed and adapted to be moved in a forward direction 14 (FIG. 1) during the operation of the conveyor belt 10. The conveyor belt 10 is driven in the forward direction 14 by way of drivers (not shown) connected to the sprockets (not shown) in a manner well known in the art.

As shown more clearly in FIGS. 3, 4 and 5, each link assembly 12 has a leading end 16, a trailing end 18, a first side 20, a second side 22, an upper surface 24 and a lower surface 26. The leading end 16, the trailing end 18, the first side 20, the second side 22, an upper surface 24 and a lower surface 26 being shown in FIG. 1 and designated with respective reference numerals only with respect to one of the link assembly 12.

Each link assembly 12 also includes a first shaft opening 28 (FIG. 3) which extends generally between the first and the second sides 20 and 22 and which extends through the leading end 16 of each link assembly 12. Each link assembly 12 also includes a second shaft opening 30 (FIG. 3) which extends through the trailing end 18 of each link assembly 12 and which extends generally between the first and the second sides 20 and 22 of each link assembly 12. The dotted lines showing the shaft openings 28 and 30 in FIG. 3, more particularly extend through the leading and trailing shaft projections as well be described in greater detail below.

The conveyor belt 10 also includes a plurality of link shafts 32 (FIGS. 1 and 6). Four link shafts 32 are shown in FIG. 1 in dashed lines and designated therein by the general reference numerals 32a, 32b, 32c and 32d. Each link shaft extends through the first shaft opening 28 in one of the link assemblies 12 and through the second shaft opening 30 in another link assembly 12 for connecting the two link assemblies 12.

Each link shaft 32 includes a first end 34 and a second end 36, as shown in FIG. 1 with respect to the link shaft 32a. The first end 34 of each link shaft 32 is disposed generally near and spaced a distance from the first side 20 of one of the link assemblies 12. The second end 36 of each link shaft 32 is disposed generally near and spaced a distance from the second side 22 of one of the link assemblies 12.

A plurality of spaced apart leading shaft projections 38 (FIGS. 1-5) are formed on the leading end 16 of each of the link assemblies 12 (only one leading shaft projection 38 being designated with a reference numeral in FIGS. 1, 2, 3 and 4).

As shown more clearly in FIGS. 3, 4 and 5, each of the leading shaft projections 38 extends a distance outwardly beyond the leading end 16 of the link assembly terminating with an outward end 40. The outward ends 40 of the leading shaft projections 38 are disposed in a common plane.

Each leading shaft projection 38 has a link opening 42 (FIGS. 4 and 5) formed therethrough. The link openings 42 in the leading shaft projections 38 are aligned to form the first shaft opening 28.

Each leading shaft projection 38 has an upper surface 44 (FIGS. 4 and 5) which is disposed in a plane about coplanar with the upper surface 24 of the link assembly 12. Each leading shaft projection 38 has a lower surface 46 (FIGS. 3, 4 and 5) which extends a distance downwardly from the lower surface 26 of the link assembly 12. The lower surfaces 46 are disposed in a common plane spaced a distance from the lower surface 26 of the link assembly 12.

Each of the leading shaft projections 38 has a first side wall 52 (FIGS. 3 and 4) and a second side wall 54 (FIGS. 3 and 4). The first and the second side walls 52 and 54 each extend from the upper surface 44 of each of the leading shaft projections 38 to the lower surface 46 of each of the leading shaft projections 38. The first and the second side walls 52 and 54 each are formed on a radius and each are curved inwardly from the upper surface 44 toward the lower surface 46 of each of the leading shaft projections 38.

Each of the leading shaft projections 38 has a leading thickness 56 (FIG. 4) extending between the first and the second side walls 52 and 54 and disposed near the upper surface 44 of each of the leading shaft projections 38. Each of the leading shaft projections 38 has a lower thickness 58 (FIG. 4) extending between the first and the second side walls 52 and 54 near the lower surface 46 of each of the leading shaft projections 38. The lower thickness 58 is less than the leading thickness 56.

Each of the leading shaft projections 38 is spaced a upper distance 60 (FIG. 4) from an adjacent leading shaft projection 38 with the upper distance 60 being the distance between the second side wall 54 of one of the leading shaft projections 38 and the first side wall 52 of an adjacent leading shaft projection 38 near the upper surfaces 44 of the adjacent leading shaft projections 38. The leading shaft projections 38 are spaced a lower distance 62 (FIG. 4) apart with a lower distance 62 being the distance between the second side wall 54 of one of the leading shaft projections 38 and the first side wall 52 of an adjacent leading shaft projections 38 near the lower surfaces 46 of the adjacent leading shaft projections 38. The lower distance 62 is larger than the upper distance 60.

The side walls 52 and 54 are angled outwardly toward either the first side 20 or the second side 22, as shown more clearly in FIGS. 2 and 3. The walls 52 and 54 are angled or, in other words, extend at an angle with respect to a plane extending perpendicularly from the leading end 16 of the link assembly 12. This angled construction of the walls 52 and 54 cooperates with the trailing shaft projections (described below) to auger materials disposed in the spaces between the leading shaft projections 38 and the trailing shaft projections (described below). In addition, as the conveyor belt 10 is turned or rolled over sprockets in one direction, the angled walls 52 and 54 cooperate to dislodge materials caught between the leading shaft projections 38 and the trailing shaft projections (described below). This non parallel shape of the walls 52 and 54 combined with the natural motion of the belt during rotation will either open up space or compress the space open on the opposite motion. This tends to compress material between adjacent walls doing one rotation and open the space between the walls during the opposite rotation causing the material or debris caught between adjacent walls to become dislodged. The angled walls 52 and 54 thus cooperate to tend to self-clean the conveyor belt during the operation of the conveyor belt.

Each of the link assemblies 12 also includes a plurality of spaced apart trailing shaft projections 64 (FIGS. 1–5) formed on the trailing end 18 of each of the link assemblies 12 (only one of the trailing shaft projections 64 being designated with the reference numeral in FIGS. 1–5). Each of the trailing shaft projections 64 extends a distance outwardly from the trailing end 18 of the respective link assemblies 12 terminating with an outward end 66 (FIG. 3). The outward ends 66 of the trailing shaft projections 64 are disposed in the common plane.

A link opening 68 (FIG. 3) is formed through each of the trailing shaft projections 64. The link openings 68 are aligned and the link openings 68 cooperate to form the second shaft opening 30.

Each of the trailing shaft projections 64 has an upper surface 70 (FIG. 5), a lower surface 72 (FIG. 5), a first side wall 74 (FIG. 3) and a second side wall 76 (FIG. 3). The first and the second side walls 74 and 76 extend in substantially parallel planes and each of the first and the second side walls 74 and 76 is substantially flat, non-curved.

The lower surfaces 46 of the leading shaft projections are disposed in a plane about coplanar with the lower surfaces 72 of the trailing shaft projections 64.

Each of the trailing shaft projections 64 has a trailing thickness 78 (FIG. 3) extending between the first and the second side walls 74 and 76. The trailing thickness 78 is substantially uniform from the upper surface 70 to the lower surface 72 of the trailing shaft projections 64. The trailing thickness 78 of each of the trailing shaft projections 64 is less than the leading thickness 56 of each of the leading shaft projections 38. Each trailing thickness 78 is less than the upper distance 60 between each of the adjacent leading shaft projections 38.

In operation, each of the trailing shaft projections 64 is disposed in one of the spaces between adjacent leading shaft projections 38 on the adjacent link assembly 12. The leading shaft projections 38 are spaced apart by the upper distance 60. The upper distance 60 between each of the adjacent leading shaft projections 38 is sized so that the trailing shaft projections 64 on an adjacent link assembly 12 may be slidingly disposed in the space between two of the adjacent leading shaft projections 38 for interconnecting the two adjacent link assemblies 12 to form the conveyor belt 10.

The curved first and second sides walls 52 and 54 of each of the leading shaft projections 38 cooperates to provide a space between each leading shaft projection 38 in one of the link assemblies 12 and the adjacent first and second side walls 74 and 76 of an adjacent trailing shaft projection 64 in an adjacent link assembly 12 for exposing a substantial portion of the link shafts 32.

As shown in FIGS. 2 and 3, a plurality of belt ribs 80 are formed on the lower surface 26 of each of the link assemblies 12. Each belt rib 80 is spaced a distance from the adjacent belt ribs 80. Each belt rib 80 extends at an angle generally between the leading end 16 and the trailing end 18 of each of the link assemblies 12.

As shown in FIG. 3, each link assembly 12 comprises a first half 82 extending generally between the first side 20 and a central portion 84 of the link assembly 12 and a second half 86 extending generally between the second side 22 and the central portion 84 of each link assembly 12. The belt ribs 80 disposed in the first half 82 each are angled outwardly toward the first side 20 and the belt ribs 80 and the second half 86 each are angled outwardly toward the second side 22.

As shown in FIG. 3, each of the belt ribs 80 extends between the leading end 16 and the trailing end 18 of the link assembly 12. Each of the ribs 80 is spaced a distance from the leading end 16 and each of the belt ribs 80 is spaced a distance from the trailing end 18 so that leading spaces 88 exist between the belt ribs 80 and the leading shaft projections 38 and trailing spaces 90 exists between the belt ribs 80 and the trailing shaft projections 64.

Each belt rib 80 extends a distance downwardly from the lower surface 26 of the link assembly 22 terminating with an outward end 92 (FIGS. 3 and 5). The outward ends 92 are disposed in a plane substantially coplanar with the lower surfaces 46 and 72 of the respective leading shaft projections 38 and the trailing shaft projections 64.

In operation, the belt ribs 80 engage a surface over which the conveyor belt 10 is moving and the belt ribs 80 cooperate to move debris outwardly toward either the first side 20 or the second side 22 of the link assemblies 12 thereby tending to clean the debris from the link assemblies 12. The debris is moved outwardly through the leading spaces 88 and the trailing spaces 90 and out over the first and the second sides 20 and 22 of the link assemblies 12.

The outward ends 92 of the belt ribs 80 are disposed in a plane about coplanar with the lower surfaces 46 of the leading shaft projections 38 and the lower surfaces 72 of the trailing shaft projections 64.

In operation, the trailing shaft projections 64 on one of the link assemblies 12 are disposed in the spaces between the leading shaft projections 38 so that the link openings 42 and 68 of the leading shaft projections 38 and the trailing shaft projections 64 substantially are aligned. In this position, one of the link shafts 32 is disposed through the shaft openings 28 and 30 for connecting the two adjacent link assemblies 12. The remaining link assemblies are connected to these two link assemblies 12 in the same manner to form the conveyor belt 10.

As shown more clearly in FIG. 6, a curved raised portion 94 or bump is formed in each of the link shafts 32. When the link shaft 32 is disposed through the first or the second shaft opening 28 or 30, the raised portion 94 is forced through the respective shaft opening 28 or 30 until the link shaft 32 is properly positioned in the shaft opening 28 or 30. The raised portion 94 is disposed between one of the leading shaft projections 38 and one of the trailing shaft projections 64 with the raised portion 94 engaging a portion of the leading shaft projection 38 or a portion of the trailing shaft projection 64 for substantially preventing inadvertent removal of the link shaft 32. It should be noted that additional raised portions may be formed on each of the link shafts 32 and each of these additional raised portions would be constructed and operated exactly like the raised portion 94 described in detail before.

As shown in FIG. 1, some of the link assemblies include a central link module 96, a first end link module 98 and a second end link module 100. The central link module 96 is constructed exactly like the link assemblies described before. The first and the second end link modules 98 and 100 each are constructed exactly like the link assemblies 12 described before, except the belt ribs 80 on the first end link module 98 and the belt ribs 80 on the second end link module 100 each extend angularly only in one direction. The first end link module 98 is disposed on one end of the central link module 96 and the second end link module 100 is disposed on the opposite end of the central link module 96.

Shown in FIGS. 7 and 8 is a modified link assembly 12a which is constructed exactly like the link assembly 12 described before, except the link assembly 12a does not include belt ribs like the belt ribs 80 and the link assembly 12a is adapted to utilize the caps shown in FIGS. 9, 10 and 11.

The link assembly 12a includes a belt rib 120 which is formed on or connected to the lower surface 26a of the link assembly 12a. The belt rib 120 extends a distance from the lower surface 26a terminating with an outward end 122. The outward end 122 of the belt rib 120 is disposed in a plane slightly lower than the lower surfaces 46a and 72a of the leading shaft projections 38a and the trailing shaft projections 64a, respectively. The belt rib 120 has a height 125 extending between the upper surface 24a and the outward end 122 of the belt rib 120. The shaft projections 38a and 64a each have a height 123 extending between the upper surface 24a and the lower surfaces 46a and 72a, respectively. The height 125 is greater than the height 123.

The belt rib 120 extends generally between the first side 20a and the second side 22a of the link assembly 12a. A portion of the belt rib 120 extends from the first side 20a toward the second side 22a at an angle extending upwardly from the trailing end 18a toward the leading end 16a of the link assembly 12a. A second portion of the belt rib 120 extends from the second side 22a a distance toward the first side 20a at an angle generally from the trailing end 18a toward the leading end 16a of the link assembly 12a. The first portion of the belt rib 120 extends from the first side 20a to about a mid-portion of the link assembly 12a and the second portion of the belt rib 120 extends from the second side 22a to about a midportion of the link assembly 12a. The belt rib 120 thus extends from about the first side 20a to about the second side 22a of the link assembly 12a and is shaped in the form of a V-shape.

The V-shape of the belt rib 120 tends to sweep debris outwardly toward the sides 20a and 22a of the link assembly 12a.

The present invention also contemplates a plurality of caps with a typical cap being shown in FIGS. 9, 10 and 11 and designated therein by the general reference numeral 124. The cap 124 has a head 126. The head 126 generally is circularly shaped.

A first prong 128 is connected to the cap 126 and the first prong 128 extends a distance about perpendicularly from the cap 126.

The cap 124 includes a second prong 130. The second prong 130 is connected to the cap 126 and the second prong 130 extends a distance about perpendicularly from the cap 126.

The first prong 128 is spaced a distance 132 from the second prong 130 (FIG. 9).

A connecting lip 134 is connected to the end of the first prong 128, opposite the end of the first prong 128 which is connected to the cap 126. The connecting lip 134 extends a distance outwardly from the first prong 128 forming a connecting surface 136.

A connecting lip 138 is connected to the end of the second prong 130, opposite the end of the second prong 130 which is connected to the cap 126. The connecting lip 138 extends a distance outwardly from the second prong 130 forming a connecting surface 140.

One end of a bar 142 is connected to the cap 126. The bar 142 extends a distance about perpendicularly from the cap 126. The bar 142 is disposed between the first prong 128 and the second prong 130. More particularly, the first prong 128 is spaced a distance 144 from the bar 142 and the second prong 130 is spaced a distance 146 from the bar 142.

In operation, a recess is formed in the leading shaft projections 38a or the trailing shaft projections 64a near the sides 20a and 22a of the link assembly 12a, a typical recess being shown in FIG. 11 in the trailing shaft projections 64a near the first side 20a of the link assembly 12a with the recess being designated by the reference numeral 148. The first and the second prongs 128 and 130 are inserted through the link openings 68a in the shaft projections 64a to a position wherein the cap 124 is disposed in the recess 148 and the connecting lips 134 and 138 on the respective first and second prongs 128 and 130 each extend a distance beyond the shaft projection 64a whereby the connecting surfaces 136 and 140 engage the shaft projections 64a and prevent inadvertent removal of the cap 124.

As the first and the second prongs 128 and 130 are being inserted through the link openings 68, the connecting lips 134 and 138 engage a portion of the shaft projections 64a formed by the link openings 68a and force the first and the second prongs 128 and 130 in a direction generally toward the bar 142 to the position shown in FIG. 9 in dashed lines with respect to the prong 130. This collapsing of the prongs 128 and 130 permits the connecting lips 134 and 138 to be moved through the link opening 68a of the shaft projection 64. The bar 142 engages portions of the shaft projections 64a formed by the link opening 68 to prevent the prongs 128 and 130 from being inadvertently collapsed during the operation of the conveyor thereby cooperating to prevent inadvertent removal of the cap 124. The bar 142 is generally rectangularly shaped and has opposite sides 150 and 152 as shown in FIG. 10. The opposite sides 150 and 152 of the bar 142 are disposed in planes about coplanar with the respective opposite sides of the first and the second prongs 128 and 130.

As shown in FIG. 8, the link assembly 12a has a link 154 extending between the first side 20a and the second side 22a. In this instance, the projection 64a closest the side 20a is prepared in the sense that a recess like the recess 148 is formed in the surface thereof with that prepared surface being designated $P_1$ of one in FIG. 8. In this instance, the projection 38a closest the side 22a is prepared in the same manner with that surface being designated $P_2$.

In many instances, it is desirable to change the link of the link assembly 12a to fit a particular application. In a preferred embodiment, the link assembly 12a also includes prepared surfaces designated $P_3$ and $P_4$ in FIG. 18a. In this manner, the length of the link assembly 12a may be changed by cutting off a portion of the link assembly 12a to provide different lengths 156, 158 or 160.

The actual width of module plastic belting can be critical to maintain gap between the edge of the belt and the conveyor frame work. Some reasons for maintaining a minimum gap are sanitation and avoiding the loss of conveyed product. Another reason for desiring and ability to supply belts of actual width is to come as close as possible to the normal width specified by the user, regardless of the unit of measures specified (metric or inches).

Module plastic belting by its nature of assembly is most easily assembled in multiples of units. The units are equal to the width of the projections 38a and 64a, or said another way, the unit of width is the distance from any point on the projection 38a to an equal point on an adjacent projection 38a or the same with respect to a projection 64a.

In a preferred embodiment, a link assembly 12a also includes prepared surfaces designated $P_3$ and $P_4$ in FIG. 8. In this manner, the length of an end link assembly 12a may be changed by molding or cutting off a portion of the link assembly 12a to provide different lengths 154, 156 or 160 as shown in FIG. 8 while still allowing for a finished edge appearance and the use of the caps 124. In this example, the length 154 is any multiple of units long with the units being the distance between any one point on the projection 38a where the projection 64a to an equal point on an adjacent projection 38a or 64a, respectively. The length 156 is any multiple of the units long minus the width of the projection 38a. The length 158 is any multiple of units long minue the width of the projections 64a.

Changes may be made in the construction and operation of the various elements and components described herein without departing from the spirit and the scope of the invention as defined in the following claims.

What is claimed:

1. A conveyor belt comprising:
   a plurality of link assemblies, each link assembly having a leading end, a trailing end, an upper surface, a lower surface, a first side and a second side, the leading end of each link assembly being connectable to the trailing end of one of the link assemblies for forming the conveyor belt;
   a plurality of spaced apart leading shaft projections being formed near the leading end of each link assembly and spaced apart along the leading end of each of the link assemblies with each leading shaft projection having a link opening formed therethrough, the link openings in the leading shaft projections being aligned to form a first shaft opening, each leading shaft projection extending a distance outwardly from the leading end of the link assembly terminating with an outward end, each leading shaft projection having an upper surface about coplanar with the upper surface of the link assembly, a lower surface spaced a distance from the lower surface of the link assembly, a first side wall and a second side wall, and each leading shaft projection having a leading thickness near the upper surface thereof extending between the first and the second side walls of the leading shaft projection, the first and the second side walls each being curved inwardly from the upper surface toward the lower surface of each leading shaft projection forming a lower thickness of each leading shaft projection near the lower surface thereof and extending between the first and the second side walls, with the lower thickness of each leading shaft projection being less than the leading thickness of each leading shaft projection;
   a plurality of trailing shaft projections formed generally near the trailing end of each link assembly and spaced generally along the trailing end of each link assembly with each trailing shaft projection having a link opening formed therethrough with the link openings in each of the trailing shaft projections being aligned to form a second shaft opening; and
   a plurality of link shafts, each link shaft being disposed through the aligned first and second shaft openings formed by two of the link assemblies for connecting the two link assemblies; and
   wherein the curved first and second side walls of each of the leading shaft projections cooperates to provide a space between each leading shaft projection in one of the link assemblies and the adjacent trailing shaft projection in an adjacent link assembly for exposing a substantial portion of the link shafts.

2. The conveyor belt of claim 1 wherein each trailing shaft projection is defined further as having an upper surface about coplanar with the upper surface of the link assembly and each trailing shaft projection extending a distance from the trailing end of the link assembly terminating with an outward end, and each trailing shaft projection extending a distance from the lower surface of the link assembly terminating with a lower surface spaced a distance from the lower surface of the link assembly, and each trailing shaft projection having a substantially flat first side wall and a substantially flat second side wall, and each trailing shaft projection having a trailing thickness extending between the first and the second side walls with the trailing thickness of each of the trailing shaft projection being less than the leading thickness of each of the leading shaft projections and with the trailing thickness of each trailing shaft projection being about the same from the upper surface to the lower surface of each leading shaft projection, whereby each trailing shaft projection is disposable in the space between two adjacent leading shaft projections for interconnecting adjacent link assemblies, the trailing shaft projections on each link assembly being disposable between adjacent leading shaft projections on one of the other link assemblies to a position wherein the first shaft opening formed through the leading shaft projections is substantially aligned with the second shaft opening formed through the trailing shaft projections.

3. The conveyor belt of claim 1 wherein the first and the second side walls of each of the leading shaft projections is defined further as being angled outwardly from the leading end of each link assembly with each of the first and the second side walls of the leading shaft projections extending at an angle with respect to a plane extending about perpendicularly from the leading end of the link assemblies.

4. The conveyor belt of claim 1 wherein each link assembly further comprises a plurality of belt ribs disposed on the lower surface of each of the link assemblies, each of the belt ribs extending a distance from the lower surface of the link assemblies and terminating with an outward end, the outward end of each of the belt ribs being disposed in a plane substantially coplanar with the lower surfaces of the leading shaft projections and the trailing shaft projections, each of the belt ribs extending at an angle for engaging material disposed near the lower surface of the belt and for moving such material outwardly toward the first and the second sides of the link assemblies.

5. The conveyor belt of claim 4 wherein the lower surfaces of the leading shaft projections and the lower surfaces of the trailing shaft projections are disposed in a coplanar disposition.

6. The conveyor belt of claim 4 wherein each of the belt ribs is defined further as being spaced a distance from the leading end of each link assembly forming a leading space between each belt rib and the leading end of each link assembly, and wherein each belt rib is defined further as being spaced a distance from the trailing end of each link assembly forming a trailing space between each of the belt ribs and the trailing end of the link assembly, the material tending to move toward the first and the second sides of the link assembly moving through the leading spaces and the trailing spaces.

7. The conveyor belt of claim 1 wherein each of the link shafts is defined further to comprise opposite ends and a raised portion positioned between the opposite ends of the link shaft, the raised portion being engageable with the first or the second side wall of one of the leading shaft projections and engageable with the first or the second side wall of one of the trailing shaft projections for substantially preventing the link shaft from being inadvertently removed from an assembled position interconnecting two of the link assemblies.

8. A conveyor belt comprising:
a plurality of link assemblies, each link assembly having a leading end, a trailing end, a first side, a second side, an upper surface and a lower surface, the leading end of each link assembly being connectable to the trailing end of one of the other link assemblies for forming the conveyor belt;
a plurality of belt ribs formed on the lower surface of each of the link assemblies, each of the belt ribs extending a distance from the lower surface of the link assembly and terminating with an outward end;
a plurality of leading shaft projections formed near the leading end of each link assembly and spaced apart from the leading end of each link assembly with each of the leading shaft projections having an upper surface substantially coplanar with the upper surface of the link assembly and the lower surface spaced a distance from the lower surface of the link assembly;
a plurality of trailing shaft projections with each trailing shaft projection having an upper surface substantially coplanar with the upper surface of the link assembly and the lower surface spaced a distance from the lower surface of the link assembly; and
wherein the outward ends of the belt ribs are disposed in a plane about coplanar with the lower surfaces of the leading shaft projections and the trailing shaft projections, the outward ends of the belt ribs being engagable with a surface for tending to move material disposed near the lower surface of the link assemblies outwardly towards the first and second sides of the link assemblies.

9. A conveyor belt comprising:
a plurality of link assemblies, each link assembly having a leading end, a trailing end, a first side, a second side, an upper and a lower surface, the leading end of each link assembly being connectable to the trailing end of one of the other link assemblies to form the conveyor belt, a first shaft opening being formed through the leading end of each of the link assemblies and a second shaft opening being formed through the trailing end of each link assembly, the first and the second shaft openings being aligned when the two link assemblies are interconnected; and
a plurality of link shafts, each link shaft having opposite ends and being disposed through the aligned first and second shaft openings of two interconnected link assemblies to interconnect the adjacent link assemblies, each link shaft having a raised portion formed on a portion thereof and the raised portion on each link shaft being positioned and spaced a distance between the opposite ends of the link shaft, each raised portion being engageable with a portion with one of the link assemblies for substantially preventing inadvertent removal of the link shaft.

10. A conveyor belt comprising:
a plurality of link assemblies, each link assembly having a leading end, a trailing end, an upper surface, a lower surface, a first side and a second side, the leading end of each link assembly being connectable to the trailing end of one of the link assemblies for forming the conveyor belt;

a plurality of spaced apart leading shaft projections, each leading shaft projection having side walls and each of the leading shaft projections extending a distance outwardly from the leading end of each of the link assemblies with the side walls of each of the leading shaft projections extending at an angle with respect to a plane extending substantially perpendicularly from the leading end of the link assemblies, each leading shaft projection having a link opening formed therethrough with the link openings and the leading shaft projections being aligned to form a first shaft assembly;

a plurality of trailing shaft projections formed generally near the trailing end of each link assembly and spaced generally along the trailing end of each link assembly with each trailing shaft projection having a link opening formed therethrough with the link openings in each of the trailing shaft projections being aligned to form a second shaft opening; and a plurality of link shafts, each link shaft being disposed through the aligned first and second shaft openings formed by two of the link assemblies for connecting the two link assemblies; and wherein each of the trailing shaft projections is defined further as having an upper surface substantially coplanar with the upper surface of the link assembly with each trailing shaft projection extending a distance from the trailing end of the link assembly and terminating with an outward end, each trailing shaft projection extending a distance from the lower surface of the link assembly and terminating with a lower surface spaced a distance from the lower surface of the link assembly, and each trailing shaft projection having a substantially flat first side wall and a substantially flat second side wall; and wherein each link assembly further comprises a plurality of belt ribs disposed on the lower surface of each of the link assemblies, each of the belt ribs extending a distance from the lower surface of the link assemblies and terminating with an outward end, the outward end of each of the belt ribs being substantially disposed in a plane coplanar with the lower surfaces of the leading shaft projections and the trailing shaft projections, each of the belt ribs extending at an angle for engaging material disposed near the lower surface of the belt and for moving such material outwardly toward the first and the second sides of the link assemblies.

11. The conveyor belt of claim 10 wherein the lower surfaces of the leading shaft projections and the lower surfaces of the trailing shaft projections are disposed in a coplanar disposition.

12. The conveyor belt of claim 10 wherein each of the belt ribs is defined further as being spaced a distance from the leading end of each link assembly forming a leading space between each belt rib and the leading end of each link assembly, and wherein each belt rib is defined further as being spaced a distance from the trailing end of each link assembly forming a trailing space between each of the belt ribs and the trailing end of the link assembly, the material tending to move toward the first and the second sides of the link assembly moving through the leading spaces and the trailing spaces.

13. The conveyor belt of claim 10 wherein each of the link shafts is defined further to comprise opposite ends and a raised portion positioned between and spaced a distance from the opposite ends of the link shafts, the raised portion being engageable with the first or the second side wall of one of the leading shaft projections and engageable with the first or the second side wall of one of the trailing shaft projections for substantially preventing the link shaft from being inadvertently removed from an assembled position interconnecting two of the link assemblies.

14. A conveyor belt comprising:

a plurality of link assemblies, each link assembly having a leading end, a trailing end, an upper surface, a lower surface, a first side and a second side, the leading end of each link assembly being connectable to the trailing end of one of the other link assemblies for forming the conveyor belt;

a plurality of spaced apart leading shaft projections formed near the leading end of each link assembly and spaced apart along the leading end of each of the link assemblies with each leading shaft projection having a link opening formed therethrough, the link openings in the leading shaft projections being aligned to form a first shaft opening, and each leading shaft projection having a width, each of the leading shaft projections having side walls which are formed on a curve;

a plurality of trailing shaft projections formed near the trailing end of each of the link assemblies and spaced generally along the trailing end of each link assembly with each trailing shaft projection having a link opening formed therethrough with the link openings in each of the trailing shaft projections being aligned to form a second shaft opening, each trailing shaft projection having a width with the width of each of the leading shaft projections being greater than the width of the trailing shaft projections, each of the trailing shaft projections having side walls which extend substantially perpendicularly from the trailing end of the link assemblies; and a plurality of link shafts, each link shaft being disposed through the aligned first and second shaft openings formed by two of the link assemblies for connecting the two link assemblies; and wherein the curved side walls on the leading shaft projections cooperate to provide a space between each of the leading shaft projections and one of the link assemblies and the side wall of the adjacent trailing shaft projection in an adjacent link assembly for exposing a substantial portion of the link shafts.

15. A conveyor belt comprising:

a plurality of link assemblies, each link assembly having a leading end, a trailing end, an upper surface, a lower surface, a first side and a second side, the leading end of each link assembly being connectable to the trailing end of one of the other link assemblies for forming the conveyor belt;

a plurality of spaced apart leading shaft projections being formed near the leading end of each link assembly and spaced apart along the leading end of each of the link assemblies with each leading shaft projection having a link opening formed therethrough, the link openings in the leading shaft projections being aligned to form a first shaft opening, each leading shaft projection extending a distance outwardly from the leading end of the link assembly and terminating with an outward end, each leading shaft projection having an upper surface and a lower surface, a first side wall and a second side wall, the first and the second side walls of each of the leading shaft projections extending at an angle from the outward end of the leading shaft projection toward the leading end of the link assembly, the first and the second side walls of each of the leading shaft projections extending at about the same angle from the outward end of the leading shaft projection for the leading end of the link assembly;

a plurality of trailing shaft projections formed near the trailing end of each of the link assemblies and spaced generally along the trailing end of each of the link assemblies with each trailing shaft projection having a link opening formed therethrough with the link openings in each of the trailing shaft projections being aligned to form a second shaft opening, each of the trailing shaft projections having side walls and each of the side walls of each trailing shaft projection extending substantially perpendicularly from the trailing end of the link assembly; and a plurality of link shafts, each link shaft being disposed through the aligned first and second shaft openings formed by two of the link assemblies for connecting the two link assemblies; and wherein the angled first and second side walls of each of the leading shaft projections cooperates to provide the space between each leading shaft projection and one of the link assemblies and the adjacent side wall of the adjacent trailing shaft projection and an adjacent link assembly for exposing a substantial portion of the link shafts.

16. A conveyor belt comprising:

a plurality of link assemblies, each link assembly having a leading end, a trailing end, an upper surface, a lower surface, a first side and a second side, the leading end of each link assembly being connectable to the trailing end of one of the other link assemblies for forming the conveyor belt;

a plurality of spaced apart leading shaft projections being formed near the leading end of each link assembly and spaced apart along the leading end of each of the link assemblies with each leading shaft projection having a link opening formed therethrough, the link openings in the leading shaft projections being aligned to form a first shaft opening, each leading shaft projection extending a distance outwardly from the leading end of the link assembly and terminating with an outward end, each leading shaft projection having an upper surface and a lower surface, a first side wall and a second side wall, the first and the second side walls of each of the leading shaft projections extending at an angle from the outward end of the leading shaft projection toward the leading end of the link assembly, the first and the second side walls of each of the leading shaft projections extending at about the same angle from the outward end of the leading shaft projection for the leading end of the link assembly;

a plurality of trailing shaft projections formed near the trailing end of each of the link assemblies and spaced generally along the trailing end of each of the link assemblies with each trailing shaft projection having a link opening formed therethrough with the link openings in each of the trailing shaft projections being aligned to form a second shaft opening; and a plurality of link shafts, each link shaft being disposed through the aligned first and second shaft openings formed by two of the link assemblies for connecting the two link assemblies.

* * * * *

UNITED STATES PATENT AND TRADEMARK OFFICE
CERTIFICATE OF CORRECTION

PATENT NO. : 5,339,946

DATED : August 23, 1994

INVENTOR(S) : Faulkner et al.   Page 1 of 3

It is certified that error appears in the above-identified patent and that said Letters Patent is hereby corrected as shown below:

Cover page, Abstract, line 2, please delete "assemblies" and substitute therefor --assembly--.

Column 3, line 15, please delete "a" and substitute therefor -- an --.

Column 3, line 26, please delete "projections" and substitute therefor -- projection --.

Column 3, line 49, please delete "doing" and substitute therefor -- during --.

Column 4, line 61, please delete "exists" and substitute therefor -- exist --.

Column 4, line 65, please delete "link assembly 22" and substitute therefor -- link assembly 12 --.

Column 6, line 34, please delete "cap 126" and substitute therefor -- head 126 --.

Column 6, line 36, please delete "cap 126" and substitute therefor -- head 126 --.

Column 6, line 38, please delete "cap 126" and substitute therefor -- head 126 --.

Column 6, line 40, please delete "cap 126" and substitute therefor -- head 126 --.

UNITED STATES PATENT AND TRADEMARK OFFICE
CERTIFICATE OF CORRECTION

PATENT NO. : 5,339,946
DATED : August 23, 1994
INVENTOR(S) : Faulkner et al.

It is certified that error appears in the above-identified patent and that said Letters Patent is hereby corrected as shown below:

Column 6, line 45, please delete "cap 126" and substitute therefor -- head 126 --.

Column 6, line 50, please delete "cap 126" and substitute therefor -- head 126 --.

Column 6, line 53, please delete "cap 126" and substitute therefor -- head 126 --.

Column 6, line 55, please delete "cap 126" and substitute therefor -- head 126 --.

Column 7, lines 27-28, please delete "link 154" and substitute therefor -- length 154 --.

Column 7, lines 39-40, please delete "FIG. 18a" and substitute therefor -- FIG. 8 --.

Column 7, lines 42-43, please delete "lengths 156, 158 or 160" and substitute therefor -- lengths 154, 156 or 158 --.

Column 7, line 48, please delete "and" and substitute therefor -- an --.

Column 7, line 65, please delete "160" and substitute therefor -- 158 --.

Column 8, line 5, please delete "minue" and substitute therefor -- minus --.

UNITED STATES PATENT AND TRADEMARK OFFICE
CERTIFICATE OF CORRECTION

PATENT NO. : 5,339,946
DATED : August 23, 1994
INVENTOR(S) : Faulkner et al.       Page 3 of 3

It is certified that error appears in the above-identified patent and that said Letters Patent is hereby corrected as shown below:

Column 9, line 9, please delete "projection" and substitute therefor -- projections --.

Signed and Sealed this

Twenty-third Day of May, 1995

Attest:

BRUCE LEHMAN

Attesting Officer       Commissioner of Patents and Trademarks